E. H. HOLLIS.
BEET HARVESTER.
APPLICATION FILED OCT. 15, 1912.
1,092,216.
Patented Apr. 7, 1914.
10 SHEETS—SHEET 1.
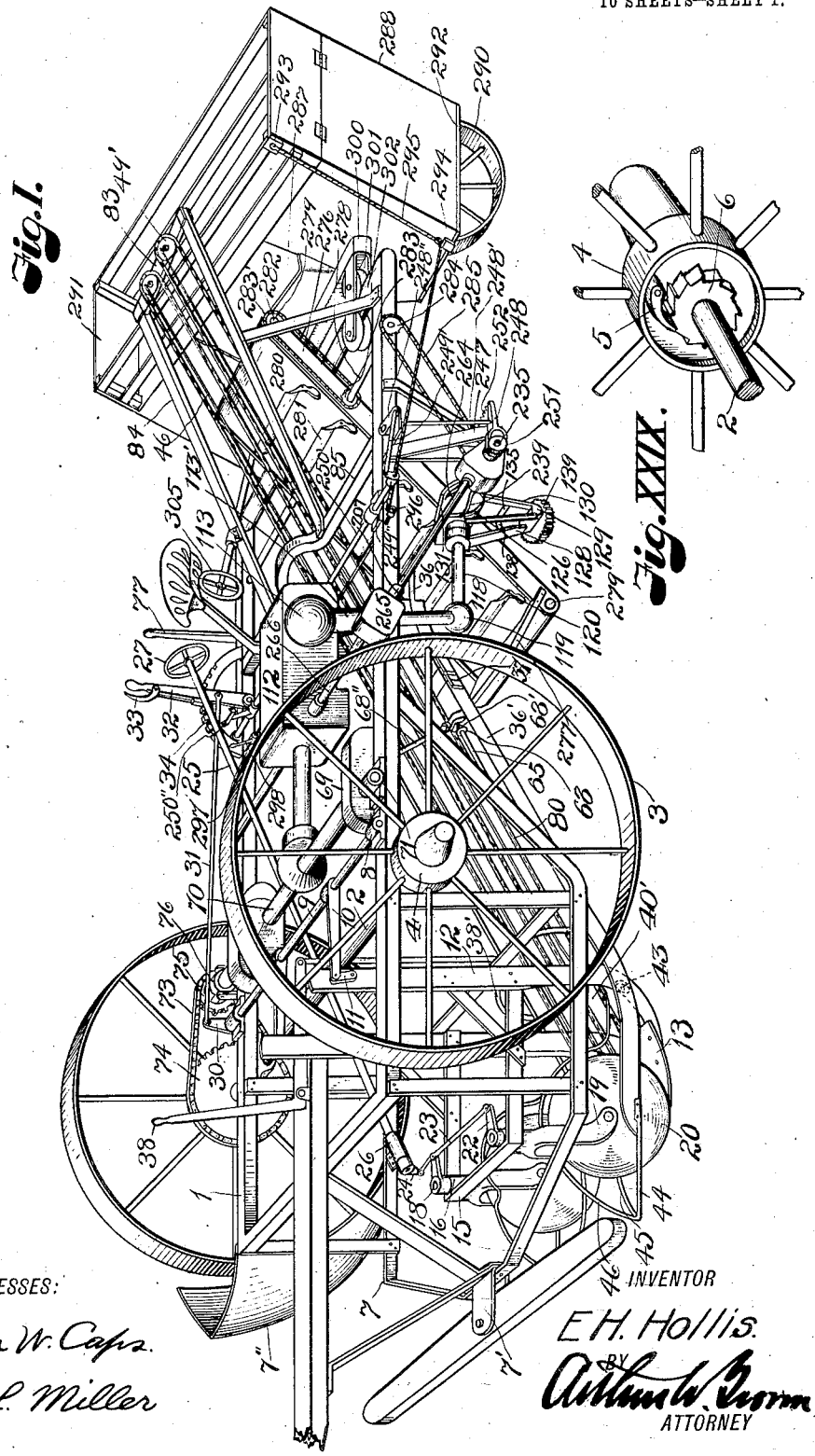
WITNESSES:
Arthur W. Capps.
Seurs L. Miller
INVENTOR
E. H. Hollis.
BY
Arthur W. Brown
ATTORNEY

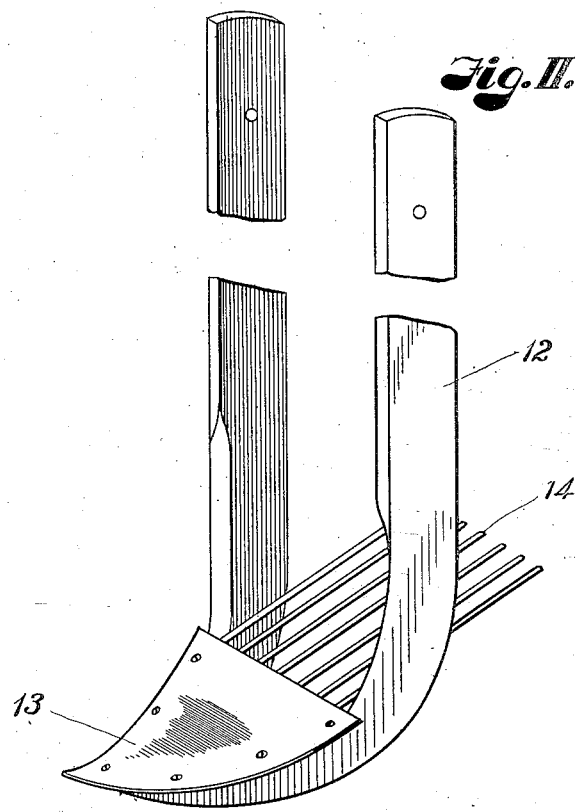
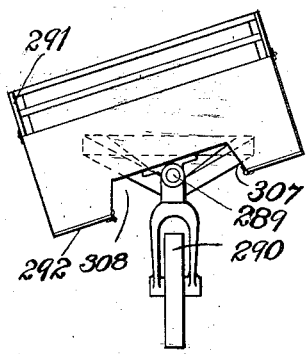
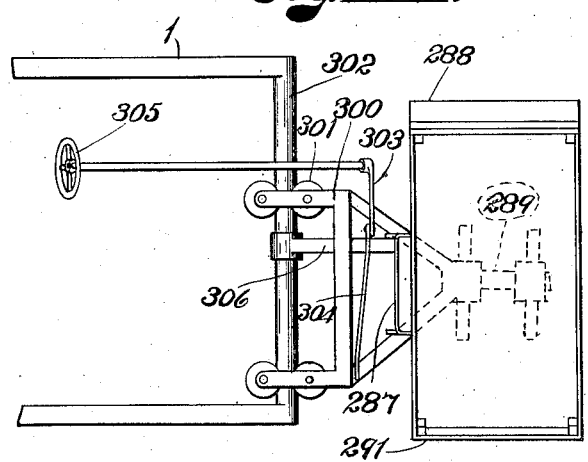

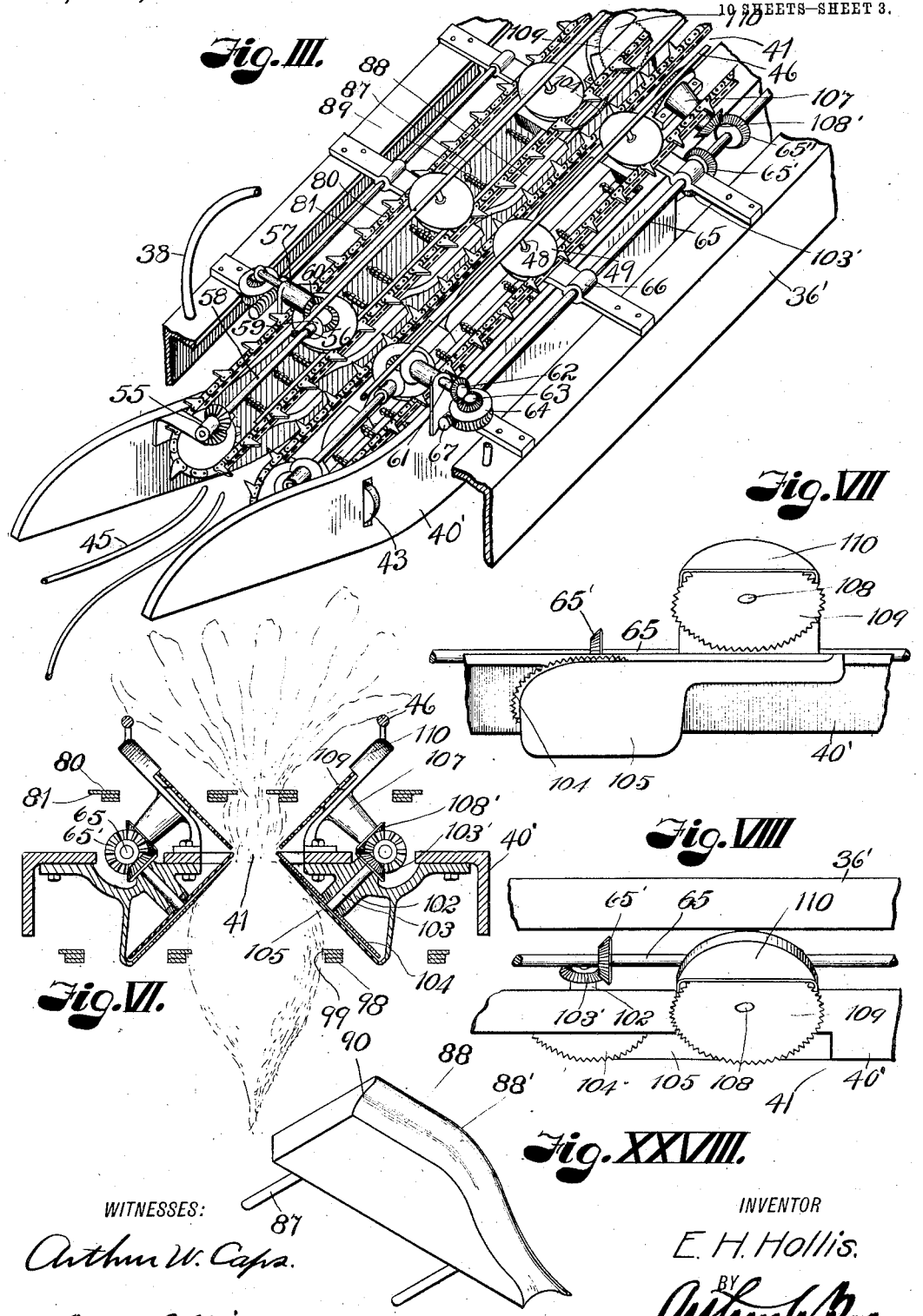

E. H. HOLLIS.
BEET HARVESTER.
APPLICATION FILED OCT. 15, 1912.
1,092,216.
Patented Apr. 7, 1914.
10 SHEETS—SHEET 4.
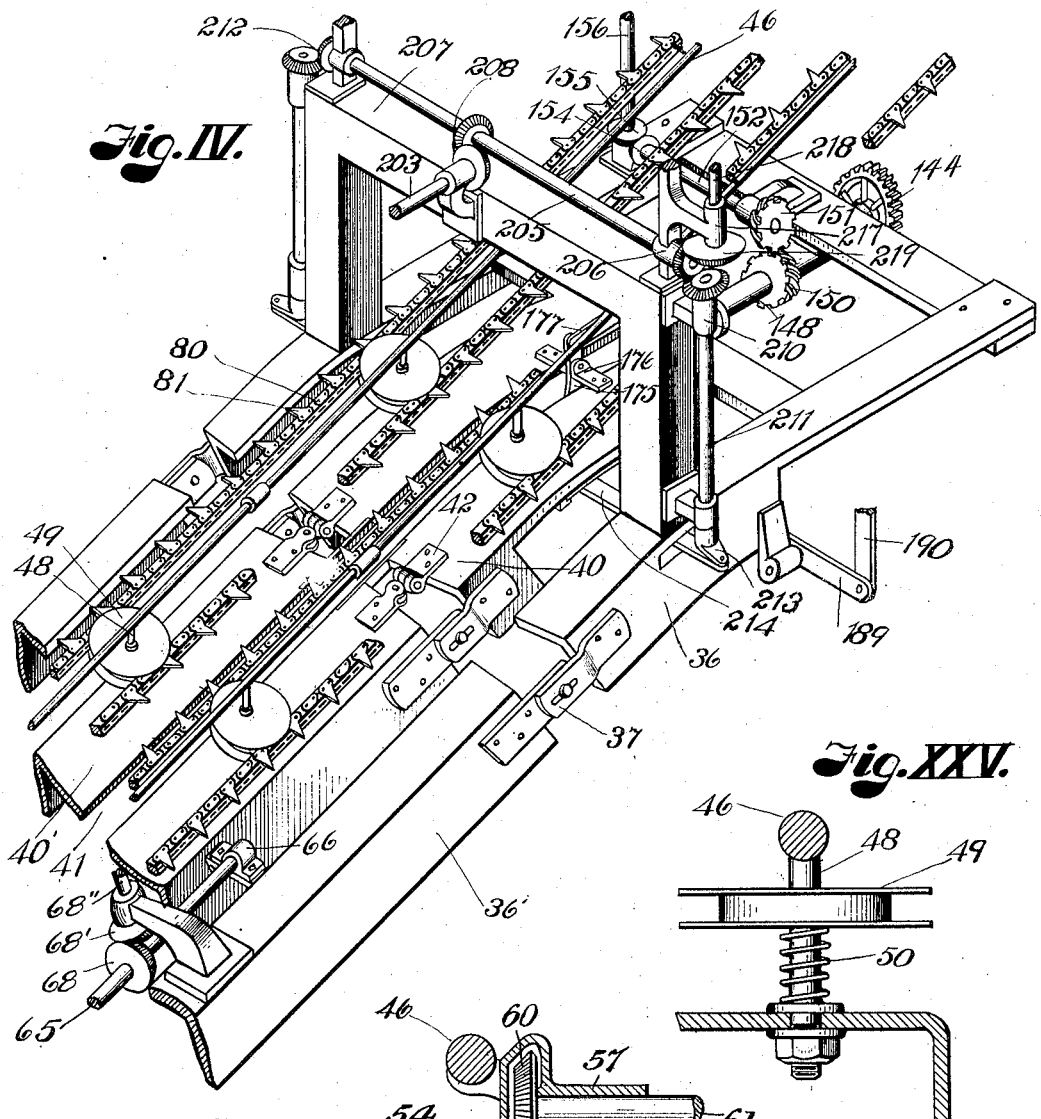
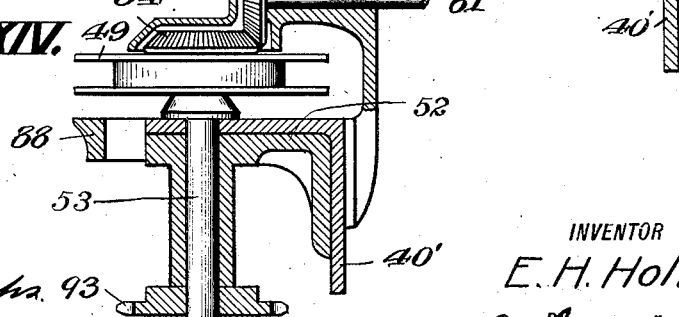
WITNESSES:
Arthur W. Capps
Lewis L. Miller
INVENTOR
E. H. Hollis
Arthur V. Brown
ATTORNEY

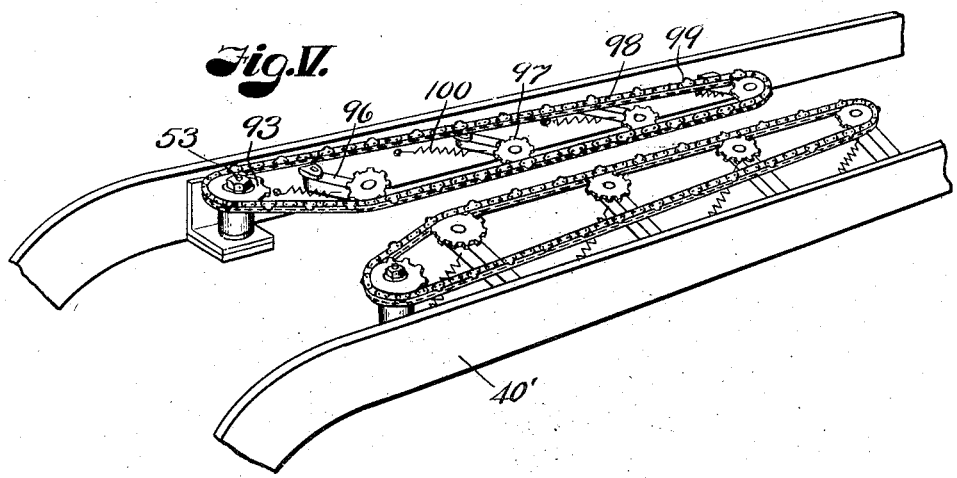
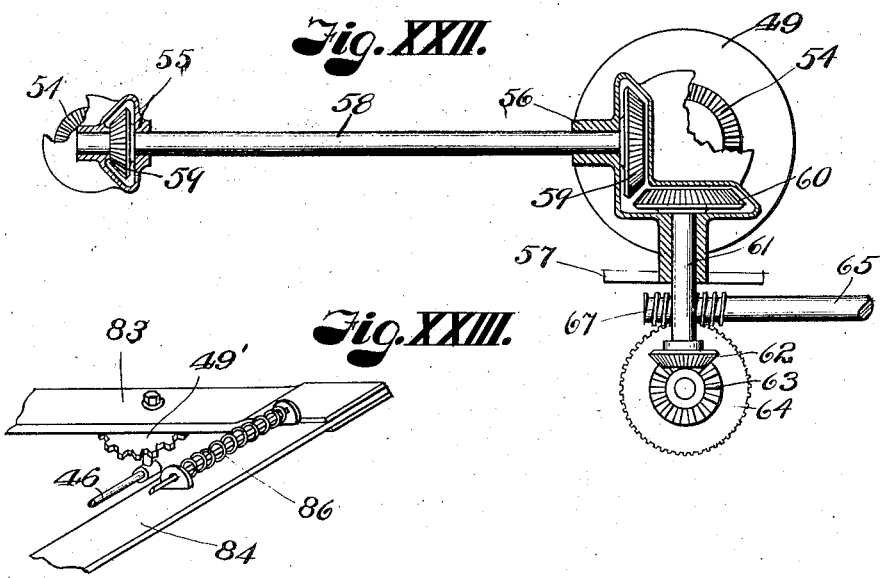

E. H. HOLLIS.
BEET HARVESTER.
APPLICATION FILED OCT. 15, 1912.
1,092,216.
Patented Apr. 7, 1914.
10 SHEETS—SHEET 6.
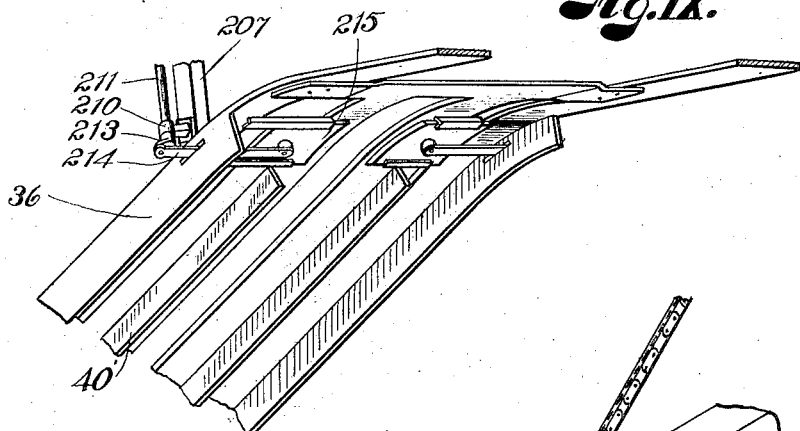
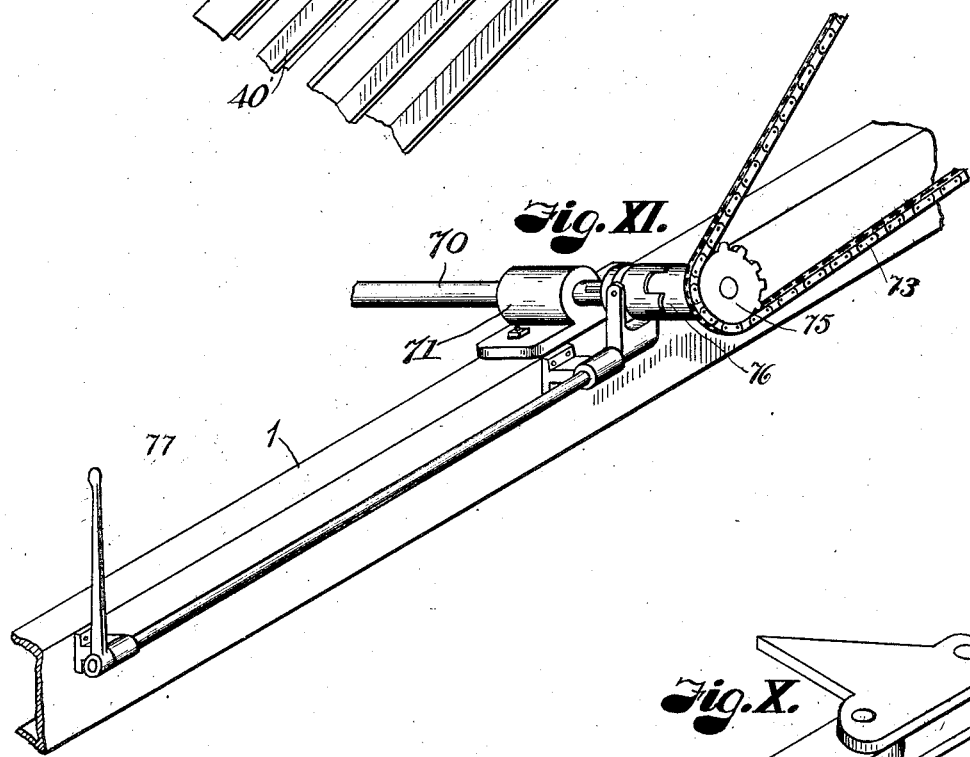
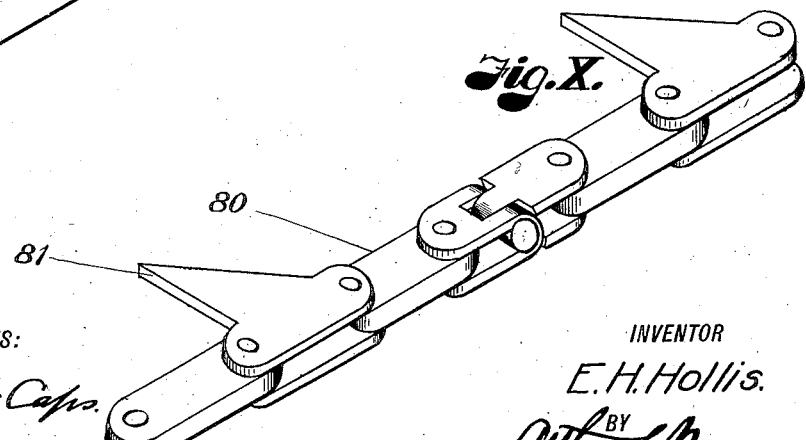
WITNESSES:
INVENTOR
E. H. Hollis.
BY
ATTORNEY

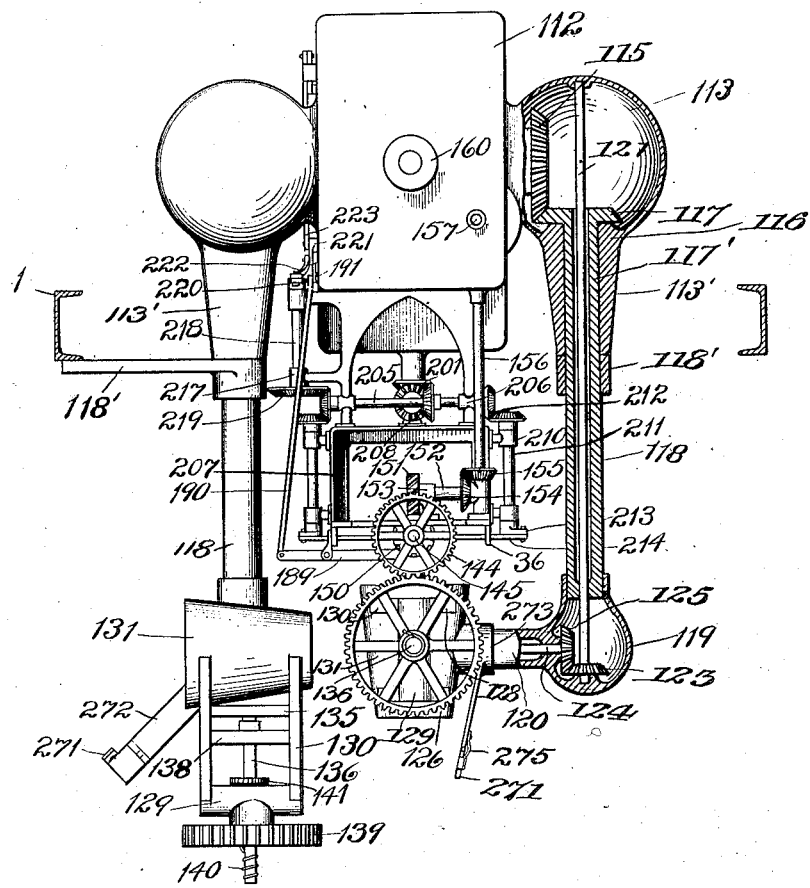

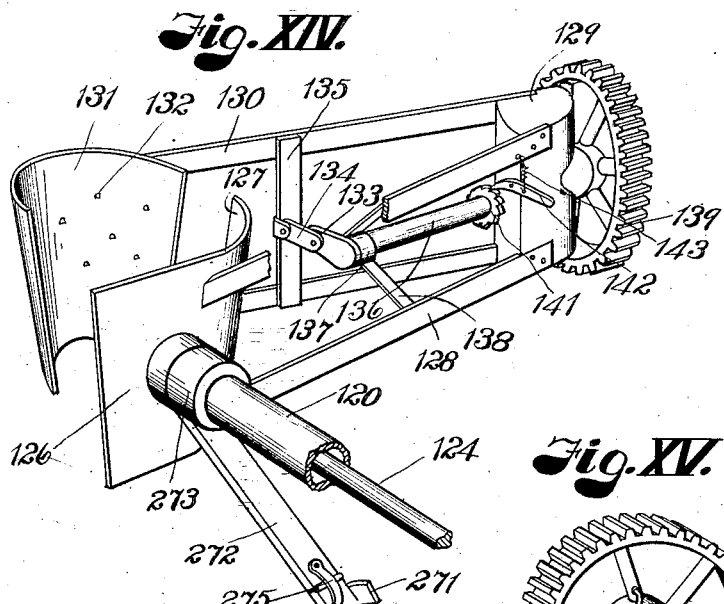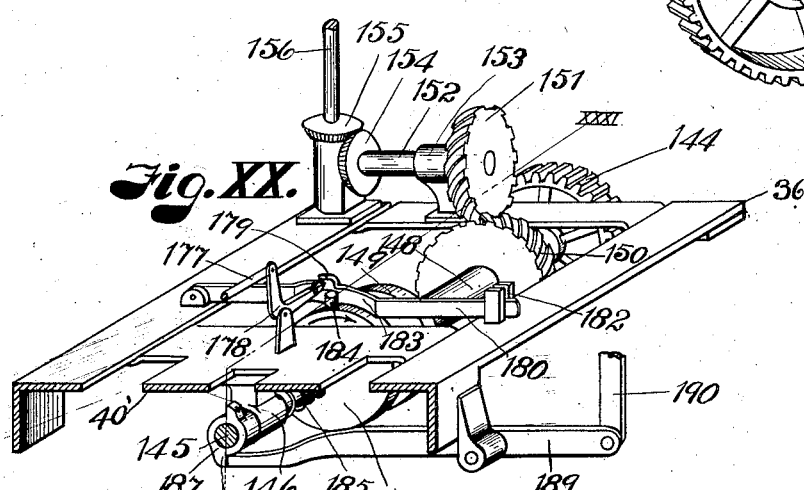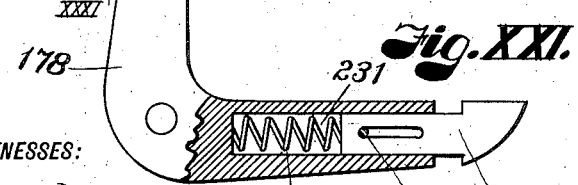

E. H. HOLLIS.
BEET HARVESTER.
APPLICATION FILED OCT. 15, 1912.
1,092,216.
Patented Apr. 7, 1914.
10 SHEETS—SHEET 9.
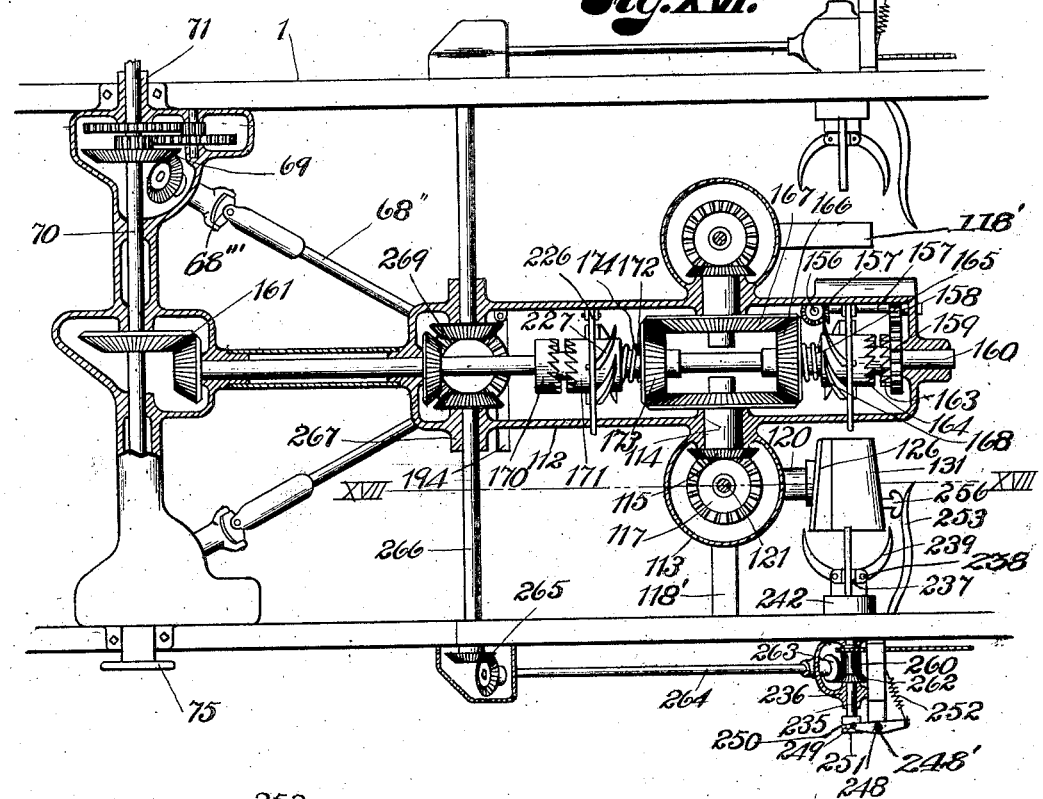
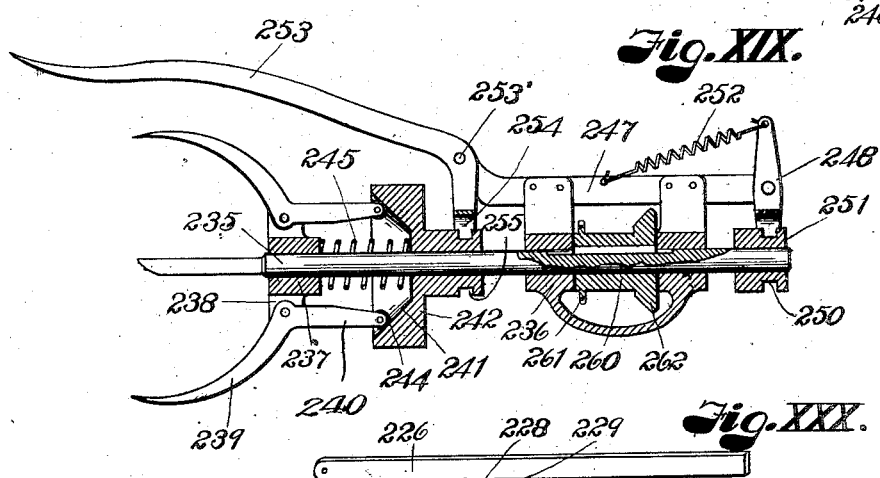
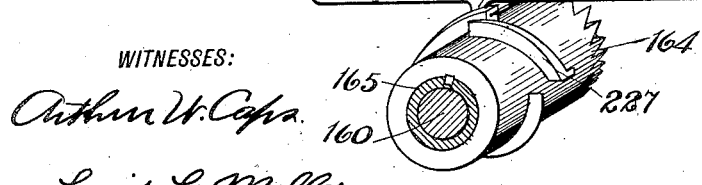
WITNESSES:
Arthur W. Capes.
Lewis L. Miller
INVENTOR
E. H. Hollis.
BY
Arthur W. Crom.
ATTORNEY

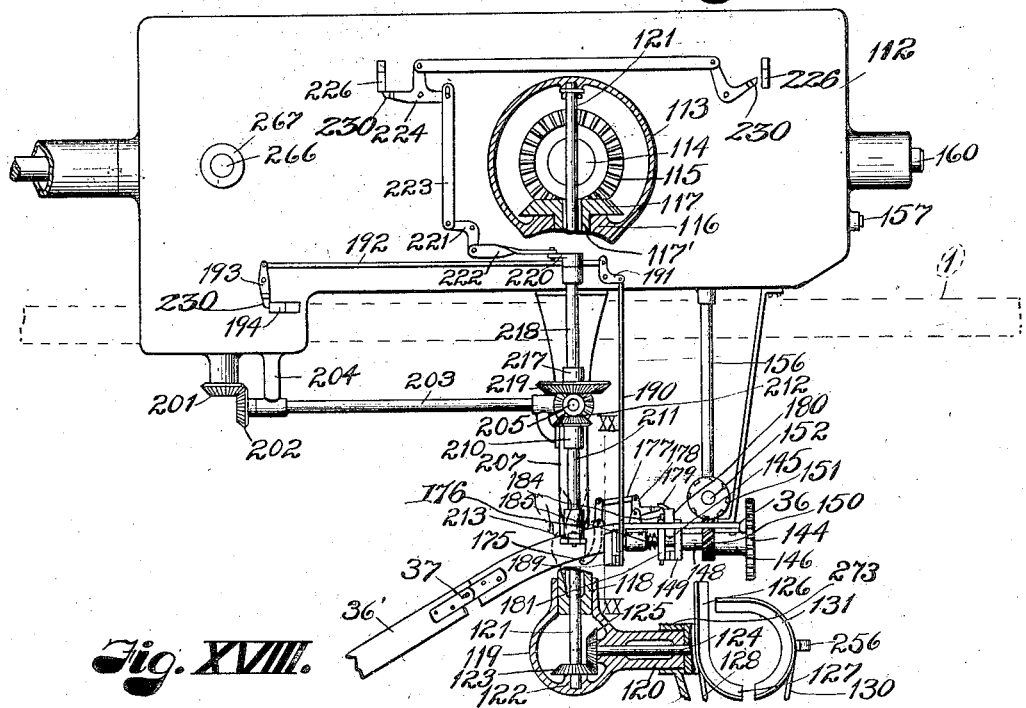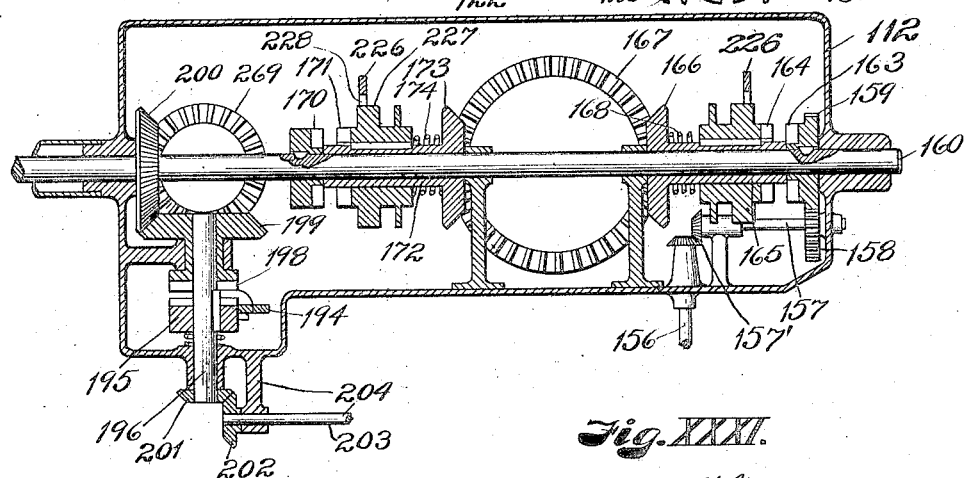

UNITED STATES PATENT OFFICE.

ELBERT H. HOLLIS, OF KANSAS CITY, KANSAS, ASSIGNOR OF FORTY-NINE ONE-HUNDREDTHS TO JOHN THOMAS, OF KANSAS CITY, KANSAS.

BEET-HARVESTER.

1,092,216.

Specification of Letters Patent.

Patented Apr. 7, 1914.

Application filed October 15, 1912. Serial No. 725,774.

*To all whom it may concern:*

Be it known that I, ELBERT H. HOLLIS, a citizen of the United States, residing at Kansas City, in the county of Wyandotte and State of Kansas, have invented certain new and useful Improvements in Beet-Harvesters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to beet harvesters, and has for its principal object to provide an apparatus of that character whereby beets may be dug from the ground, their tops cut and sprouts removed, beets and tops delivered into a common receptacle and finally piled with the beets covered by the tops to protect same from the weather, such operations occurring in proper sequence during the travel of the beet through the apparatus. In accomplishing this object, I have provided the improved details of structure hereinafter described and illustrated in the accompanying drawings, wherein:—

Figure I is a perspective view of a beet harvester constructed according to my invention. Fig. II is an enlarged detail perspective of the shovel for removing the beets from the ground. Fig. III is a similar view of the lower portion of the conveyer showing the belts and notching knives. Fig. IV is a similar view of the upper portion of the conveyer illustrating the flexible frame. Fig. V is an inverted perspective view of the lower conveyer. Fig. VI is a transverse section of the conveyer and notching knives. Fig. VII is an enlarged elevation of the notching knives. Fig. VIII is a plan view of same. Fig. IX is a rear perspective of the upper portion of the conveyer frame showing the top cutting knives. Fig. X is a detail perspective of a portion of the upper conveyer belt. Fig. XI is a detail perspective of the main clutch and shipping lever. Fig XII is an enlarged rear elevation of the transmission mechanism showing the beet carrying parts in relative positions. Fig. XIII is a diagrammatic view of the carrying clamps. Fig. XIV is a detail perspective of one of the clamps and its operating mechanism. Fig. XV is a detail perspective of the driving gear wheel forming part of the clamp mechanism. Fig. XVI is a plan view of the transmission gearing for operating the beet clamps and trimmers. Fig. XVII is a side elevation of one of the clamp sets, the gear casings for the set being in vertical section, on line XVII—XVII, Fig. XVI. Fig. XVIII is a vertical section of the transmission illustrated in Fig. XVI. Fig. XIX is a longitudinal view, partly in section, of one of the trimmers and its operating mechanism. Fig. XX is a detail perspective of the initial clutch for controlling the different operations, the part in the foreground being taken on the line XX—XX, Fig. XVII. Fig. XXI is a detail view, partly in section, of the latch operable by the clutch controlled member and adapted for releasing the transmission clutch to throw the initial clutch mechanism into operation. Fig. XXII is a detail plan view of the transmission for actuating the upper conveyer belts. Fig. XXIII is an inverted detail perspective of the upper end of the conveyer frame showing the belt tightening mechanism. Fig. XXIV is a vertical section of one of the lower conveyer sheave wheels and its driving gear. Fig. XXV is an elevation of one of the upper sheaves showing the spring for tensioning the sheave upwardly. Fig. XXVI is an end view of the beet and top receptacle. Fig. XXVII is a plan view of the beet and top receptacle. Fig. XXVIII is an enlarged inverted perspective of one of the conveyer blocks. Fig. XXIX is a perspective view of the ratchet for the driving wheels. Fig. XXX is a perspective view of the clutch for releasing the clamp arms. Fig. XXXI is a section on the line XXXI—XXXI, Fig. XX.

Referring more in detail to the parts:—
1 designates a truck frame of skeleton formation and preferably constructed of metal and mounted on a front axle 2 which in turn is carried by ground wheels 3. Each of the front ground wheels is provided with a chambered hub 4 having a pawl 5 pivoted therein and adapted for engagement with a ratchet 6 fixed on the axle 2 so that either or both wheels may drive the axle when the machine is moved forwardly, allowing the wheels to operate independently of each other.

Suspended from the upper part of frame 1 is a hanging frame 7 to which the doubletree, or any suitable draft device 7' may be attached, and which is also provided with a guard 7" that extends in front of one of the ground wheels.

Journaled in bearings 8 on the frame 1 is a rod 9 having forwardly directed levers 10 fixed thereon and provided at their free ends with links 11 which are in turn pivotally connected with and adapted for supporting shovel hangers 12 (Fig. II), the lower ends of which are directed forwardly and are connected, the shovel 13 having rearwardly directed fingers 14 adapted for delivering beets dug by the shovel onto the conveyer, presently described. The hangers 12 carry a forwardly directed frame 15 having vertical bearings 16 within which the shafts 18 of the colter yokes 19 are revolubly mounted, said yokes in turn carrying the colters 20 which are adapted for travel on opposite sides of and in front of the shovel 13 in order to mark a furrow at the sides of the beet groove, and assist the shovel in uncovering the beets without unnecessarily disturbing the soil at the sides of the row.

Inasmuch as there may be some irregularity in the rows, I provide for varying the direction of the colters and shovels by providing the yoke shafts 18 with levers 22 which are connected by a rod 23 having connection with a crank member 24 on a rod 25 which is journaled in a bearing 26 on the frame 7 and provided with a hand-wheel 27 adjacent the operator's seat so that an operator on the apparatus may by manipulating hand-wheel turn the colters in order that they may follow a row.

In order to vary the depth of the shovel so that it need only dig to sufficient depth to uncover the beets I provide the rod 9 which, through the arms 10, carries the shovel with a crank member 30 having a rod 31 leading to a lever 32 adjacent the operator's position. The lever 32 has a latch 33 adapted for coöperation with a quadrant 34 for holding the shovel at a desired elevation.

Suspended from the main frame 1, near about the center thereof, is a conveyer platform 36, preferably comprising angle irons and having a forwardly and downwardly inclined section 36' connected therewith by hinge members 37, so that the extension may have lateral or vertical adjustability. The lower end of the conveyer frame 36' (Fig. III) is suspended from the hand lever 38 near the forward part of the main frame 1 by a bail 38'. Fixed within the platform 36 are angle members 40 arranged in parallel relation with their inner edges spaced to form a channel 41 their lower ends being in substantial alinement with the stationary members 36 of the outer platform bars and connected with extension members 40' by universal hinges 42 in order that the extensions may move laterally or vertically to follow the shovel, as will presently be described.

The greater portion of the horizontal flanges of members 40' are cut away at their lower ends to afford greater space for mounting and to expose the conveyer mechanism presently described, the lower ends of the vertical flanges, as well as those of members 36' being curved forwardly at the sides of the shovel.

In the lower ends of the inner frame members 40' are rollers 43 which are adapted to engage the vertical shovel bars 12 in order that the parts may move freely relative to each other when either part is adjusted, either manually or automatically.

Fixed to the frame 36' and extending forwardly therefrom to the front of each of the colters is a guard rod 44 having a finger 45 directed over the inner side of the colter to turn the beet tops into the path of the shovel, and having a body portion 46 bent upwardly over the colter and extended above the inner conveyer frame 40—40' and above an auxiliary frame presently described to which their upper ends are secured, each of the rods being broken above the hinged portion of the frame and provided with a slide collar whereby the parts may telescope relative to each other when the frame is bent laterally or vertically in order that the rods may follow the frame.

Fixed to the upper flanges of the inner conveyer frame members 40—40' are studs 48 (Fig. XXV) which are connected with the rods 46 and revolubly mounted on each of the studs is a sheave wheel 49. Surrounding each stud 48 is a spring 50 which is adapted for yieldingly tensioning the sheave wheel 49 upwardly on its stud.

On the lower portion of the conveyer frame from which the greater portion of the top flanges are removed are brackets 52 (Fig. XXIV) and revolubly mounted in said brackets are studs 53, similar to the studs 48 heretofore described, each of said studs having a sheave wheel 49 revolubly mounted thereon, and the two lower wheels each being provided with a beveled gear wheel 54 on its upper face.

Journaled in a bearing 55 (Figs. III and XXII) carried by the lower end of the inner conveyer frame 40' and in a bearing 56 on a bracket 57, also mounted on said frame, is a shaft 58 having beveled gear wheels 59 meshing with the gear wheels 54 on the sheaves 49 whereby the end sheave wheel is driven from the next lowest.

The last named wheel receives its driving power from a beveled gear 60 which is fixed on a shaft 61 that is journaled in the bearing 57 and has a beveled gear wheel 62 on its outer end meshing with a mating gear 63 on a worm wheel 64 that is revolubly mounted on the outer conveyer frame and constitutes a step-down mechanism.

A shaft 65 is revolubly mounted in bearings 66 on the outer conveyer frame and has a worm 67 at its lower end which meshes with the worm wheel 64 and drives same to actuate the conveyer sheave wheels, the shaft 65 having a beveled gear wheel 68 (Fig. IV) which is driven by a pinion 68' having a flexible joint 68''' (Fig. XVI) on a shaft 68'' which extends to and has step up geared connection 69 with the counter shaft 70 which is journaled in bearings 71 on the main frame and has driving connection with the axle 2 through a chain 73 and sprocket wheels 74—75, a clutch 76 of any ordinary construction being provided for the drive shaft and adapted for control from a lever 77 located adjacent the operator's seat (Fig. XI).

Running over the sheave wheels 49 is a chain 80 having teeth 81 thereon (Fig. X) arranged in pairs in the opposite belts so that when the sheaves revolve the chains will be carried upwardly in their inner path and the teeth 81 will pair to grip a beet therebetween.

The transmission for the conveyer chains is arranged to travel at the same speed as the machine so that when the conveyer teeth grip a beet delivered thereto from the shovel the beet will not be jerked from the ground by the travel of the belt or by the drag thereof, but will rise perpendicularly as the machine travels forwardly, thereby easily removing same from the ground and obviating the pulling of the tops therefrom.

In order to afford some resiliency to the conveyer belts and still retain them sufficiently taut to handle the beets, I mount the upper wheels 49' on a sliding crossbar 83 at the top of an auxiliary frame 84 carried by a cross member 85 on the main frame 1, and suitably braced from the rear of the frame and provide the side members of said extension frame with expansion springs 86 (Fig. XXIII), which are adapted to push outwardly on the crossbar to tension the conveyer belts.

Slidably mounted in apertures in the sides of the inner conveyer frame members, near the bottom thereof, are paired pins 87 which carry blocks 88 beneath the conveyer belts and are surrounded by expansion springs 89 which bear against the inner faces of the frame members and against the blocks to yieldingly tension the latter outwardly into the path of beets riding upwardly into the conveyer.

Each of the blocks 88 (Fig. XXVIII) has an outwardly bowed bearing surface 88' which is back turned to form a concaved seat 90 adapted to lie over the upper ends of the beets, as the latter bear thereagainst and beyond the beets so that they are held in vertical position as they are carried upwardly, the blocks being yieldable in order to accommodate beets of different size.

The studs 53 which carry the next to the bottom sheave wheels 49 extend down beneath their brackets and carry sprockets 93.

Hingedly mounted to the inner faces of the inner conveyer frame members 40', above the sprocket wheels 93, are arms 96 (Fig. V), and revolubly mounted on the under faces of said arms are sprocket wheels 97, the upper arm of each series terminating beneath the central portion of the main frame 1.

Running over the sprocket wheels 93 and 97 are chain belts 98, each of which has teeth 99 projected outwardly therefrom and preferably so arranged that when the paired belts are traveling through their inner circuit the teeth will be paired so that they may grip the lower portion of a beet therebetween.

In order to hold the arms 96 projected inwardly at substantially a right angle to the frame members, I provide springs 100, the opposite ends of which are connected to the frame members and to the arms and are adapted to pull backwardly against the arms to hold the belts taut and in their extended position so that under ordinary conditions a narrow path is marked thereby, it being apparent that when a beet of more than usual thickness is gripped between the chains, the arms will move backwardly against the tension of their springs in order that the large beet may be carried along by the chains.

On the inner frame members, just above the point where the upper flanges of the members are cut away, said members are provided with paired bearings 102 (Fig. VI), and journaled in said bearings are shafts 103, each of which carries a circular saw 104, the shafts and saws being arranged at an incline relative to the travel of beets through the conveyer, and both of the saws being arranged below the plane of the conveyer members so that they converge inwardly and upwardly.

Each of the frame members is provided with a guard plate 105 which extends over the outer face of its saw and protects same from frictional contact traveling up the conveyer in order that the saws may have free revoluble movement.

Fixed on the inner frame members above the bearings 102 are similar but oppositely inclined bearings 107, each of which carries a shaft 108 which in turn carries a circular saw 109, the upper saws converging inwardly and downwardly so that when operated in conjunction with the lower saws they will cut a V-shape notch at each side of the top of the beet.

The upper saws have hoods 110 covering their upper edges and protecting same from the beet tops or from interference on account of dirt or the like dropping thereonto from above.

Each of the shafts 103 and 108 has a beveled gear 103' and 108', meshing with a beveled gear 65'—65'' on the shaft 65 which is supported on the conveyer frame and driven as heretofore described, the difference in size between the gear wheels and worm mechanism causing the saws to revolve much more rapidly than the elevator sheave wheels, in order that the saws may operate properly and the conveyer belts be driven at the proper speed.

After a beet has passed the saws which cut the notches therein, it is carried on upwardly by the conveyer to a gripper into which it is delivered and within which it is held so that the tops may be removed and the body of the beet carried to the side of the frame and moved against a trimmer, whereby the top of the beet is shaved to remove the stubs of the top and any sprouts which may have grown thereon.

In order to increase the efficiency of the machine, I provide two grippers which move in planetary paths, that is, revolve about their axes as they travel around a fixed point, one of said grippers being adapted for receiving the beet while the other is carrying a previously received beet to the trimmers and delivering same to a conveyer.

The grippers are duplicates of each other and mounted on opposite sides of the gear casing 112 carried at about the center of the main frame 1, but as each of the grippers and its operating mechanism is identical with the other but one will be described in detail, with the understanding that such description relates equally to both.

At the side of the casing 112 is a sub-case 113, (Figs. XII and XVI) in which is journaled a horizontal shaft 114, having a beveled gear wheel 115 fixed thereon and adapted for revoluble movement within the sub-case.

Journaled in the bearing 116 in the bottom of the sub-case is a pinion 117 which meshes with the gear 115 and has a hub extended through the bottom of the sub-case and through an extension 113' thereof.

The hub 117' carries a tubular member 118 which depends below the gear casing and a frame is suspended therefrom, and rigidly mounted on the lower end of member 118 is a case 119 having a laterally directed arm 120.

Fixed in the top of the sub-case 113 and extending downwardly through the pinion 117 and tubular member 118 is a shaft 121, the lower end of which seats in the bearing 122 in the bottom of the case 119 and has a beveled gear wheel 123 rigidly fixed thereon.

Journaled in the laterally directed arm 120 is a shaft 124, the inner end of which has a pinion 125 within the case 119 and meshing with the gear wheel 123, and the outer end of which carries the fixed gripping member 126 which preferably comprises a piece of sheet metal having a back flange 127 curved inwardly to interrupt the travel of a beet coming up the conveyer, the body portion and the flange being both inclined to correspond with the tapered shape of a beet.

Fixed on the member 126 are bars 128 (Fig. XIV) which carry a head 129 at their outer end upon which the inwardly directed spring arms are mounted, the inward end of the arms 130 carrying the concave member 131 of the gripper in position to close toward the fixed member 126 and grip a beet therebetween.

Both of the gripper members are preferably provided with studs 132 for projection into a beet to assist in holding the same in place. The movable member of the gripper is closed against the fixed member by means of a toggle mechanism 133, the link 134 of which is connected with a crossbar 135 on the spring arms 130 that carry the movable member 131 and the crank member of which is fixed on a shaft 136 revolubly mounted in the head 129 and in a bearing 137 which is carried by arms 138 extending from the bars 128.

The shaft 136 extends through the head and has a gear wheel 139 revolubly mounted on its outer end and yieldingly connected therewith by a spring 140 (Fig. XV) which is adapted to tension when the shaft 136 draws the movable gripper member against a beet and thereby yieldingly hold same in the gripper without damaging the beet or the machine.

In order to hold the movable member in its gripping position after it has been closed against the tension of the spring arms 130 by the revolution of the gear 139, I provide the shaft 136 with a ratchet 141 and pivot a pawl 142 on the head 129 so that the pawl may be yieldingly held in position by the spring 143 for locking the movable gripper member in a holding position.

The gear wheel 139 in each gripping mechanism meshes with a single driving gear wheel 144 which is fixed on a shaft 145 revolubly mounted in bearing 146 which is suspended from the conveyer platform 36 carried beneath the gear casing 112 (Fig. XVII).

Revolubly mounted on the shaft 145 is a collar 148 having a half-revolution clutch member 149 at one end and a spiral gear 150 at the opposite end (Fig. XX).

Meshing with the wheel 150 is a driving gear 151 which is fixed on a shaft 152 revolubly mounted in bearing 153 on the conveyer platform and provided with a beveled gear wheel 154 which meshes with a wheel 155 on a vertical shaft 156 which extends up through the bottom of the gear casing and is connected with a counter shaft 157 by beveled gears 157' (Figs. XVI and XVIII).

The shaft 157 has a gear wheel 158 meshing with the gear wheel 159 fixed on the gear shaft 160 which is journaled in the casing 112 and extends forwardly therefrom to the main driving shaft with which it is connected through the beveled gearing 161 so that when the driving shaft is revolved the gear shaft will be constantly turned therewith.

The gear wheel 159 has a clutch face 163 adapted for engagement by the sliding quarter-revolution clutch 164 which is feathered on the extended hub 165 of the beveled gear wheel 166 which meshes with both of the gear wheels 167 on the horizontal shafts 114 through which the grippers are actuated.

An expansion spring 168 surounds the portion of the hub between the beveled gear wheel and the clutch member and normally yieldingly tensions the clutch member outwardly so that it will automatically engage the clutch face 163 unless restrained. Also fixed on the gear shaft 160 at the forward end of the casing is a clutch member 170 which is adapted for engagement by a quarter-revolution clutch 171 feathered on the extended hub 172 of a gear wheel 173 which is adapted for engagement with the gear wheels 167 from the front and normally tensioned toward engagement with the fixed clutch by an expansion spring 174.

It is apparent that the beveled gears 166 and 173 will drive the gear wheels 167 in opposite directions when connected with the shaft 160, and that by making connections alternately the grippers may be rocked to and from the trimming position, the movement of the separate grippers being opposite on account of each having individual connection with the oppositely operated gear wheels 167.

In order to operate the mechanism at the proper time relative to the travel of the beet, I provide releasing mechanism comprising a trigger 175 (Figs. IV and XVII) which is located at about the level of the lower conveyer belts and in the path of the body of the beet and is pivotally mounted in a bracket 176 carried by the conveyer platform.

The trigger 175 has a rod 177 connected with its upper end and runs backwardly to a bell crank lever 178 pivotally mounted on the conveyer frame 36 and the trip arm of which lies below a lip 179 of a latch bar 180 (Fig. XX) which is pivotally mounted on the frame and extends thereacross above the clutch member 181 which is keyed on shaft 145 and adapted for engagement with the half-revolution clutch 149 on the sleeve 148, the outer end of the bar being normally held in a slotted bracket 182 and its central portion having an incline 183 adapted for engaging pins 184 on the loose clutch member to hold the clutch open against the tension of a spring 185 and open the clutch against the tension of such spring when the latch bar is returned to active position after each half-revolution.

Fixed on the shaft 145 is a double throw cam 187 having two oppositely disposed dogs 188 thereon adapted for operative engagement with a trip 189 which is pivotally mounted on the conveyer platform and has a link 190 extended upwardly and connected with a bell crank lever 191 (Figs. XII and XVII) which is pivotally mounted on the gear casing, a link 192 being also connected with a bell crank and with a trip 193 pivotally mounted on the forward portion of the casing and adapted for actuating a bar 194, (Fig. XVIII) similar to the bar 180 just described, for controlling the clutch member 195 which is feathered on a vertical shaft 196 in the gear casing and yieldingly tensioned toward a fixed clutch member 198 comprising a gear wheel 199 which meshes with a gear wheel 200 on the shaft 160 and is adapted for revolving the shaft 196 when the parts are in mesh.

Fixed on the shaft 196 below the casing is a beveled gear 201 which meshes with a single gear 202 on a shaft 203 which is journaled in a depending bearing 204 and extends to the shaft 205 which is journaled in bearing 206 on a standard 207 on the conveyer platform and drives said shaft through the beveled gearing 208.

Journaled in bearings 210 on the standard 207 is a vertical shaft 211 having gear connection 212 with the shaft 205 and having a toggle 213 at its lower end, the toggle link 214 being extended inwardly beneath the conveyer platform (Fig. IX) and connected with sliding knives 215 which are adapted for cutting the tops from beets after the latter have been secured in the grippers.

The gearing 212 is one to one so that the shaft 211 makes a complete revolution and cutting operation with each revolution of the shaft 205 and as the shaft 211, and its parts are duplicated on opposite sides of the frame the paired knives 215 coöperate in cutting the tops from the beets.

Journaled in a bearing 217 on the standard 207 is a vertical shaft 218 having a one to two gear connection 219 with the shaft 205, and having a crank 220 fixed on its upper end. The crank 220 is connected with a bell crank lever 221 by a link 222 and the bell crank lever in turn has a link 223 by which it is connected with an arm of a T-lever 224 pivotally mounted on the side of the casing. One arm of the T-lever is adapted for rocking a latch bar 226 (Fig. XVI) which projects through the side of the casing and overhangs the inclined shipping arms 227 on the loose clutch member 171 on the forward end of the gear shaft 160.

The latch bar 226 (Fig. XXX) has a depending boss 228 adapted to hold behind the lips 229 of each shipping arm and for engagement with the inclined surface thereof, the bar being of sufficient weight to drop after the lever arm has left its contact therewith and drag against the shipping arms to move the clutch member back against the tension of its spring.

As there are four equally spaced shipping arms there will be four independent actuations of the clamp members for each complete revolution of the main gear shaft, or, in other words, the top cutters will make a complete operation with the main gear shaft when the connection is made through the beet actuated trip, and one of the members will be moved through one leg of its operation for each actuation of the cutters, that is if the clamp is in receiving position it will move to the trimming position, or vice versa.

In order to have a clamp in receiving position at all times, I arrange the paired clamps oppositely and provide a double trip for actuating same alternately, the trip on the second clamp being the duplicate of the first but so arranged that as the first clamp is moving toward its trimming position, the second clamp is moving away from the trimming position toward the receiving position.

By providing the four clutch shipping arms for each of the clamp mechanism operating clutches, I get a quick operation of the clamps so that there is no likelihood of a beet being brought to clamping position without one of the clamps being in position for receiving it.

The lever arms for operating the clutch bars 226 are preferably spring cushioned by providing same with tips 230 (Fig. XXI) which extend into the sockets 231 in the ends of the levers and are slidably anchored by a pin and slot connection 232, a spring 233 seating in the base of the socket and normally, yieldingly tensioning the tips outwardly so that it may be in position for engaging the clutch bars, but may yield inwardly when returning to set position, to enable it to pass the bar on its downward travel.

The trimmers which form a part of the apparatus each comprises a shaft 235 (Fig. XIX) which is revolubly mounted in a bearing 236 in the side of the main frame and has a collar 237 fixed on its inner end and provided with paired ears 238 within which the curved knives 239 are pivotally mounted. The knives 239 have arms 240 projected into the seat 241 of a concaved block 242 slidably mounted on the shaft and have rollers 244 adapted to slide on the inclined face of the block, a spring 245 surrounding the shaft and bearing against the base of the block and against the collar 237 to yieldingly tension the collar outwardly and hold the knives in normally spread position.

The bearing 236 is mounted on a bracket 247 and pivotally mounted on the outer end of said bracket is a lever 248, one end of which has a pin 249 projected into a peripheral groove 250 in a collar 251 fixed on the end of the shaft, and the other end of said lever carries a spring 252 which is connected with the bar 247 and yieldingly tensions the shaft outwardly. Rising from lever 248 is a shaft 248' which is provided with a lever 248'' at the top, (Fig. I) the latter being connected by means of a link 249' to a lever 249'' on shaft 250' that carries a foot pedal 250'' near the operator's seat.

Pivotally mounted on a pin 253' on the bar 247 is a setting arm 253, having a curved outer end projected inwardly past the knives 239, the outer end of said arm having a boss 254 projected into an annular groove 255 in a socket block 242.

It is apparent that when the shaft 235 is moved outwardly by the tension of the spring 252 the knife arms 240 pushing against the block 242 will rock the arm 253 to bring its outer end close to the knife blades. The outer end of said arm is adapted for engagement by a wiper 256 (Fig. XVI) on the movable member of the beet clamp, as the latter moves toward the trimmer, it being apparent that when a large beet is in the clamp the wiper will project farther than when a small beet is therein, and therefore will displace the arm 253 to a greater extent than for a small beet. The displacement of the arm 253 determines the spread of the knives 239 so that the space therebetween is regulated according to the size of the beet, with the result that when the head of a beet of any size is projected into the trimmer, the knives are set to operate for that particular size of beet.

In order to actuate the knives, I provide the shaft 235 with a spool 260 which is feathered on the shaft and comprises a sprocket wheel 261 and beveled gear wheel 262, the gear wheel 262 meshing with a similar gear wheel 263 on a shaft 264, having gearing connection 265 with a shaft 266 which is journaled in bearings 267 on the main gear case and has gear connection 269 with the main gear shaft 160, so that the trimmer is operated continuously while the machine is in operation, and the knives are always ready to act on a beet when the clamper moves same into the trimmer.

In order to steady the clamps during the trimming operation I provide the member 118 with rigid arms 118' (Fig. XII) which are adapted for frictional engagement with the under side of frame 1.

After the clamper has carried a beet to the trimmer it returns same on its next operation, and when the clamper is over about the center of the machine the pawl 142 engages a lip 271 (Fig. XIII) on an arm 272 which is carried by the mounting collar 273 of the clamping frame, so that the pawl is rocked to release the ratchet 141 and allow the spring tension of the arms 130 to spread the movable clamp member from a stationary member, so that a beet may drop therefrom onto a conveyer which is adapted for tugging the trimmed beets up into a storage receptacle.

The trip lip 271 is hinged to the arm 272 so that as the clamper frame revolves forwardly the lip may yield against the tension of the spring 275 to allow the clamper to pass without releasing the pawl and ratchet.

The elevator upon which the clamper is adapted to drop the beets comprises side members 276 which are secured to the main frame 1 by bars 277 and a shaft 278 (Fig. I). In the ends of the side members are revolubly mounted the shafts 279 which carry an apron 280 having slats 281 thereon. On the upper shaft 279 is a sprocket wheel 282 and running over said sprocket wheel and over a like wheel 283 on a shaft 278 is a chain belt 283' which is adapted to revolve the apron when the shaft 278 is revolved. The shaft 278 has a sprocket wheel 284 and a chain 285 runs over said sprocket wheel and over the sprocket wheel 261 on the spool 260 on the trimmer shaft, so that the elevator is constantly actuated while the machine is in operation.

The upper end of the elevator is projected over a chute 287 in the front of a receptacle 288 (Figs. XXVI and XXVII) which is pivotally mounted on a shaft 289 that is mounted on and extends rearwardly from the frame 1 and is provided with a caster wheel 290 for supporting the receptacle and the rear portion of the main frame.

The receptacle is divided horizontally to provide a lower chamber for the beets and an upper chamber for the tops which are delivered thereto from the lower and upper conveyers respectively, each of said chambers having hinged doors 291—292 at the ends.

Each door is held closed by a latch 293—294, the latches of both doors on the same end of the receptacle being connected with a rope 295 which is attached to a crank member 296 on a shaft 297 on the main frame and operable from a foot lever 298 located adjacent the driver's seat, so that the doors may be opened manually at will.

In order that the beets and tops may be delivered at the side of the apparatus instead of in the path thereof, I provide for moving the receptacle laterally by providing the shaft 289 with a frame 300 having guide rollers 301 adapted for travel along a cross-track 302 at the rear of the frame, the movement being effected through a lever 303 which is connected with the traveler 300 by a link 304 and a hand-wheel 305 which is located adjacent the operator's seat.

The trip 306 is fixed to the track 302 and adapted for engaging the sides 307 of a central, recessed portion 308 beneath the receptacle, so that as the latter is moved to one limit of its lateral travel it will engage the stop and tilt on its pivotal mounting to dump the contents of the receptacle through the end doors thereof.

When the receptacle is tilted, the beets in the lower chamber will be first dumped onto the ground and the tops from the upper receptacle will fall thereon so as to cover the pile of beets and protect same from the weather.

In use, the apparatus travels through the field with the shovel plowing a row of beets so that the latter are loosened from the ground and their tops gripped by the upper conveyer chains, the chains traveling at the same speed as the apparatus, so that the beets are lifted vertically from the ground. When the beets are removed from the ground they travel up the conveyer, the body portions moving past the friction blocks at the lower end of the conveyer and afterward being gripped by the lower conveyer belts, so that they are held firmly in a vertical position. As the beets are carried upwardly through the conveyer they pass the saws which cut notches in the sides thereof, and after passing the saws each beet in turn enters one of the grippers 126. Simultaneously with its entry into the gripper the beet engages the lever 175 as shown in dotted lines Fig. XVII releasing the clutch on the shaft 145 so that connection is made with the gear wheel 144, which latter then operates to revolve the gripper shaft 136 and close the gripper members over the beet, so that the latter is held independently of the conveyer, the spring 140 on the gear wheel 144 serving to cushion the gripping action in order to accommodate the gripper to different size beets, and the ratchet mechanism serving to hold the loose gripping mechanism in closed position, so that it will hold a beet after the gear wheels have been disconnected. Simultaneously with the action of the loose gripper member, the lever 189 is actuated to engage the shaft 203 with the main gear shaft so that the top cutters are actuated to cut the top from the body of the beet; the parts acting simultaneously but in such quick succession that the delivery of the beet body to the grippers does not interfere with the travel of the conveyer and the tops are carried on up by the latter to be delivered into the top of the receptacle therefor. Simultaneously with the cutting of the tops, the trip mechanism for throwing the transmission for the active gripping set into gear with the main gear wheel is actuated so that as soon as the top has been cut the hanger shaft 118 is revolved to move the grippers laterally toward the side of the frame and the trimmer. As the hanger shaft revolves, the gripper shaft 124 is revolved and the gear wheel on its inner end turning on the stationary gear 123 revolves the gripper so that by the time the latter reaches the trimming position it is traveling substantially horizontally and the large end of the beet is projected into the trimmer knives, the boss 256 on the gripper engaging the arm 253 to regulate the opening to the size of the beet for each separate operation.

When the beet is moved into the trimmer, the operator of the apparatus moves the trimmer toward the beet through the pedal mechanism, described, sufficiently to cut away all sprouts from the head of the beet, so that when the latter is returned to the conveyer position it is in condition for use. As the beet reaches the center of the apparatus, the pawl 142 which has held the gripper members together engages the lip 271 and is rocked to release the ratchet 141 so that the spring arms of the loose gripper member automatically spread to separate the gripper members and allow the beet to drop onto the elevator. The beet is then carried up the elevator and delivered into the lower chamber of the receptacle within which it is stored until the receptacle is full. While the first gripper is moving toward the trimming position, the other gripper returns from its trimming position so that it is ready to receive a succeeding beet, the actuations of the two grippers alternating and the gearing for the various parts being so arranged that the different operations described are performed on the proper sets of mechanism and in proper order. When the receptacles have been filled, the operator turns the hand wheel 305 to move the receptacle to either the right or left of the machine and opens the doors to allow the contents of the receptacles to empty onto the ground.

Having thus described my invention, what I claim as new therein and desire to secure by Letters Patent, is:—

1. A beet harvester comprising a conveyer adapted for engaging the tops of a beet, means for holding the body of a beet, a top cutter, and a trimmer adapted for actuation following the actuation of the top cutter.

2. A beet harvester comprising means for removing a beet from the ground, conveyer and elevator mechanisms adapted for separately delivering beet tops and bodies, means for separating the bodies from the tops during the travel of the beet through the harvester, and means for trimming the heads of the beets following the top cutting operation.

3. In a beet harvester, a conveyer adapted for engaging the tops of beets and carrying same through the harvester, a gripper adapted for interrupting the travel of the beet bodies, a trimmer, means for cutting the tops from the bodies, and mechanism for moving the gripper toward and from the trimmer and for delivering the beet as the gripper approaches initial position.

4. A beet harvester comprising a conveyer, means for removing beets from the ground and delivering same to the conveyer, a sub-conveyer adapted for engaging the beet bodies, a top cutter, a gripper adapted for receiving the beet bodies from the sub-conveyer, a trimmer, and mechanism for moving the gripper toward and from the trimmer, and for turning the beet during its movement toward the trimmer.

5. In a beet harvester, a conveyer extending continuously through the harvester and adapted for carrying beet tops, a sub-conveyer adapted for holding beet bodies, a gripper adapted for projection into the path of the beet bodies, a trip located within the path of the bodies, mechanism releasable by said trip for closing the gripper and for moving same to and from a trimming position, a trimmer, and means for opening the gripper as the latter reaches a delivery position on its return from the trimmer.

6. A beet harvester comprising a conveyer adapted for supporting beets from the tops, a sub-conveyer adapted for holding the beet bodies, a normally open gripper located within the path of the beets, mechanism for closing the gripper comprising a normally active shaft and clutch mechanism, a trip located within the path of the beet bodies and adapted for actuating said clutches, means for moving the gripper toward and from a trimming position, a trimmer for engaging beets carried thereto by the gripper, means for opening the gripper, an elevator adapted for receiving the beets from the gripper, and a receptacle having separate compartments into which the beet tops and bodies are delivered, for the purpose set forth.

7. A beet harvester comprising a frame and ground wheels, a plow suspended from said frame, a conveyer frame universally mounted on the frame at one end, body gripping belts on said conveyer extending from a point above said plow to a point beyond the universal mounting of said conveyer, a plurality of tines on said plow underlying the lower portion of said conveyer, a lower set of belts extending from the extremity of said tines to a point short of the universal mounting of said conveyer frame, a cutting device adjacent the upper end of said lower belts, a gripper supported from said frame and adapted to underlie said cutting device, and means for simultaneously actuating said gripper and said cutter.

8. A beet harvester comprising a frame and ground wheels, a plow, a conveyer and an elevator supported in said frame, belts on said conveyer for taking beets from said plow and for delivering the beet tops at the rear of the conveyer, a cutting device for separating the beets from their tops, a gripper for engaging the beet, means for changing the position of the gripper, a trimmer for engaging the beet in the latter position, means for returning the gripper to its former position, a trip for releasing the beet during the last named operation, and means for operating said elevator to deliver the beets at the rear of the frame.

9. A beet harvester comprising a frame and ground wheels, a plow, a conveyer and an elevator supported in tandem in said frame, belts on said conveyer for engaging beet tops, belts on the bottom of the conveyer for engaging beet bodies, a gripper at the end of said bottom belts, a cutter between said gripper and the top belts, a trimmer, means for revolving said gripper into the plane of the trimmer, means for manually forcing the trimmer against a beet held by the gripper, and means for releasing the gripper to free the beet.

10. In a beet harvester, a plow having a forwardly projecting frame, colter wheels pivotally mounted in said frame, a conveyer extending upwardly and rearwardly from the plow, tops and body gripping belts on said conveyer, and guards on said conveyer having legs passing over each of said colter wheels and continuing parallel to each of said belts, and having their inner ends terminating over the ends of said belts.

11. In a beet harvester having a frame, a plow, a gear box secured near the center of said frame, a platform suspended from said gear box, a pair of downwardly and forwardly inclined conveyer members universally mounted on said platform, a bail pivotally connecting the inclined members, a hand lever on said frame secured to said bail, a pair of belts for each of said inclined members, a plurality of yieldable blocks beneath said belts arranged to form a channel, and a plurality of tines secured to said plow and adapted for projection beneath a portion of said channel and said inclined conveyer members, for the purpose set forth.

12. In a beet harvester having a frame, a plow, a gear box secured near the center of said frame, a platform suspended from said gear box, a pair of downwardly and forwardly inclined conveyer members universally mounted on said platform and spaced to form a channel, a bail for supporting the lower ends of said inclined members, a hand lever for supporting said bail, a plurality of yieldable blocks forming the lower portion of said channel, a pair of flanges forming the upper portion thereof, a sizing device comprising a pair of circular saws inclined upwardly and toward each other and lying in a plane with the edges of the upper portion of the channel, a guard plate in front of each saw merging into the edges of the upper channel, another pair of circular saws inclined downwardly and toward each other and forming a vertex with the other saws, an upper belt for each of said inclined members, a plurality of revolubly mounted and vertically yieldable sheave wheels for carrying said belts and a pair of sprocket wheels for driving said belts and clamps adapted for intermittently operating adjacent said belts and said channel, for the purpose set forth.

13. In a beet harvester having a frame, a plow, a gear box, a platform suspended from the gear box, a pair of downwardly inclined conveyer members universally mounted on said platform and spaced to form a channel, a plurality of yieldable blocks carried by said members and projecting into said channel, a set of saws for grooving and sizing each beet, a pair of flanges for receiving said beets and clamps for removing beets from said channel.

14. In a beet harvester having a frame and ground wheels, a plow, a gear box, a platform suspended from said gear box, a pair of downwardly inclined conveyer members universally hinged to said platform, slidable on said plow and spaced to form a channel, a pair of belts paralleling said channel, a plurality of yieldable sheave wheels for supporting said belts, sprocket wheels at the lower ends of said belts, a shaft supported on said frame and actuated from said ground wheels, a step-up gear mechanism adjacent said shaft, an inclined shaft on said inclined member, a shaft flexibly connecting said first named shaft and said last named shaft, a transverse shaft on said inclined member having step-down gear connection with said inclined shaft, gear connection between said transverse shaft and one of said sheave wheels, and gear and shaft connection between said sheave wheel and said sprocket wheel, substantially as specified.

15. In a beet harvester having a frame and ground wheels, a plow, a gear box, a platform suspended from said gear box, a pair of downwardly inclined conveyer members universally hinged to said platform, slidable on said plow and spaced to form a channel, a pair of belts paralleling said channel, a plurality of sheave wheels for yieldingly supporting said belts, sprocket wheels at the lower ends of said belts, circular saws diverging from opposite sides of said channel, and a pair of cutters operable from the sides of the channel, and adjacent said belts, and a clamp beneath said cutters.

16. In a beet harvester, a frame and ground wheels, a plow, a gear box, a platform suspended from said gear box, a downwardly inclined channeled conveyer member, conveyer belts operable on each side of said channel and extending beyond said platform, a clamp pivotally mounted on said gear box and adapted for projection beneath said platform, a clutch on said platform, a trip for releasing said clutch when engaged by a beet, a gear operable from the clutch for closing said clamp, and means for operating the clutch.

17. In a beet harvester, a frame and ground wheels, a plow, a gear box, a platform suspended from said gear box, a downwardly inclined conveyer member having a channel, conveyer belts on each side of said channel and extending beyond said platform, a clamp pivotally mounted on said gear box and adapted for projection beneath said platform, a one-half revolution clutch on said platform, a trip projected into said channel for releasing said clutch, a gear operable from the clutch for closing the clamp, a double throw cam operable from the clutch and adapted for actuating the clamp, and means for releasing said clamp.

18. In a beet harvester, a frame and ground wheels, an axle for said wheels, a gear box in said frame, driving connection between said gear box and said axle, a shaft in said gear box, a pair of facing bevel gears revoluble on said shaft, clutch connection 171 between said gears and said shaft, sub-cases on each side of said gear box, a tubular right-angled arm revoluble in each of said sub-cases, a bevel gear in each side of said gear box adapted to mesh with said facing gears, gear connection between said right-angled arms and the bevel gears in the sides of the gear box, a platform suspended from said gear box, means for delivering beets to said platform, a clamp on said right-angled arm adapted for projection beneath said platform, the clutch 181 on said platform, a trip for releasing said clutch, a gear operable from said clutch for closing said clamp, a cam operable from said clutch for releasing said clutches 171, and mechanism interposed between said cam and said clutches 171 for releasing same alternately.

19. In a beet harvester, a frame and running gear, a gear box in said frame, driving connection between said gear box and running gear, a shaft in said gear box, a pair of facing bevel gears revoluble on said shaft, clutch connection 171 between said gears and said shaft, sub-cases on each side of said gear box, a tubular right-angled arm revoluble in each of said sub-cases, bevel gear connection between each of said right-angled arms and both of said facing bevel gears, a shaft rigidly mounted in said sub-case and extending downwardly through one leg of said arm, a shaft revoluble in the other leg of said arm and having bevel gear connection with said stationary shaft, a clamp rigidly secured to said revoluble shaft and means for releasing said clutches to revolve said right-angled arm in its sub-case and the clamp on its arm, for the purpose set forth.

20. In a beet harvester, a frame and running gear, a gear box in said frame, a platform suspended from said gear box, means for conveying beets to said platform, a clutch on said platform, a trip for said clutch, gear connection between said clutch and said gear box, a gear operatively connected with said clutch, sub-cases on opposite sides of said gear box, right-angled arm members revoluble in said sub-cases, a shaft in said gear box, clutches on said shaft, gear connection between said clutches and said arms, a clamp on said arms adapted for projection beneath said platform, gear closing means on said clamp adapted for engagement by said platform gear, another clutch in said gear box, a cutter on said platform gear connection between said cutter and said clutch, means operable from said last named gearing for alternately tripping said arm clutches, and means operable from said platform clutch for releasing said cutter clutch.

21. In a beet harvester, a frame and running gear, a gear box in the frame, a platform suspended from said gear box, clamps pivotally mounted on said gear box, cutters slidably mounted on said platform, and mechanism releasable by the beet for closing the clamp, actuating the cutters and alternately moving the clamps into and out of position beneath the platform.

22. In a beet harvester, a frame and running gear, a gear box in the frame, a platform suspended from said gear box, means for conveying beets to said platform, right-angled arm members pivotally mounted in said gear box, clamps on said right-angled arm members, each clamp comprising a curved member having pivotal connection with the arm, a curved member opposite the first curved member, a spring frame connecting said curved members and adapted to normally hold them apart, a shaft revolubly mounted in said frame, crank and link connection for drawing the curved members together against the tension of the frame, a ratchet and pawl for holding the same in such position, a gear yieldably mounted on said shaft, and means on said platform for engaging said gear to close said clamp.

23. In a beet harvester, a frame and running gear, a gear box in the frame, a platform suspended from said gear box, means for conveying beets to said platform, right-angled arm members pivotally mounted in said gear box, clamps pivotally mounted on said arm members and yieldably held in open position, means on said platform for closing said clamps, a ratchet for holding said clamp in closed position, and an arm rigidly secured to said right-angled arm and adapted to trip said ratchet during the pivotal movement of the clamp.

24. In a beet harvester, a frame and running gear, a gear box mounted in said frame, a platform suspended from the gear box, a pair of clamps having planetary mounting on said gear box and adapted for alternately passing beneath said platform, a pair of trimmers revolubly mounted in said main frame, gear connection between said trimmers and said gear box, and means for manually moving said trimmers toward the clamps when the latter are in one position.

25. In a beet harvester, a frame and ground wheels, a gear box mounted in the frame, a platform suspended from the gear box, a pair of clamps having planetary mounting on the gear box and adapted for alternate projection beneath the platform, a pair of trimmers one at each side of the main frame, and means carried by said clamps for regulating the opening of said trimmer.

26. In a beet harvester, a frame and ground wheels, a gear box mounted in the frame, a platform suspended from the gear box, a trimmer revolubly mounted in the frame and having driving connection with the gear box, a clamp having planetary mounting on said gear box and adapted for alternately moving beneath said platform and toward said trimmer, and means carried by said clamp for regulating the opening of said trimmer.

27. In a beet harvester, a frame and ground wheels, a gear box mounted in the frame, a platform suspended from the gear box, a clamp having planetary mounting on the gear box and adapted for projection beneath the platform, a trimmer revolubly mounted in the frame and having driving connection with the gear box, said trimmer comprising a slidable driving shaft, means for manually sliding said shaft, a collar fixed to said shaft, a plurality of knives pivotally mounted in said collar, a collar slidably mounted on said shaft and yieldably spaced from said rigid collar, and having a beveled inner face for engaging said knives and a lever pivotally mounted on said frame and adapted for engagement by said clamp to move said sliding collar, for the purpose set forth.

In testimony whereof I affix my signature in presence of two witnesses.

ELBERT H. HOLLIS.

Witnesses:
 LEWIS L. MILLER,
 LETA E. COATS.